United States Patent
Garnier (10) Patent No.: US 10,793,478 B2
(45) Date of Patent: Oct. 6, 2020

(54) SINGLE PHASE FIBER REINFORCED CERAMIC MATRIX COMPOSITES

(71) Applicant: Advanced Ceramic Fibers, LLC, Idaho Falls, ID (US)

(72) Inventor: John E. Garnier, Idaho Falls, ID (US)

(73) Assignee: ADVANCED CERAMIC FIBERS, LLC., Idaho Falls, ID (US)

(*) Notice: Subject to any disclaimer, the term of this patent is extended or adjusted under 35 U.S.C. 154(b) by 14 days.

(21) Appl. No.: 16/030,145

(22) Filed: Jul. 9, 2018

(65) Prior Publication Data

US 2019/0077718 A1    Mar. 14, 2019

Related U.S. Application Data

(60) Provisional application No. 62/556,664, filed on Sep. 11, 2017.

(51) Int. Cl.
*C04B 35/80* (2006.01)
*C04B 35/573* (2006.01)
(Continued)

(52) U.S. Cl.
CPC .......... *C04B 35/806* (2013.01); *C04B 35/571* (2013.01); *C04B 35/573* (2013.01);
(Continued)

(58) Field of Classification Search
CPC ............ C04B 35/806; C04B 35/62865; C04B 35/62863; C04B 35/62868;
(Continued)

(56) References Cited

U.S. PATENT DOCUMENTS

| 3,166,614 A | 1/1956 | Taylor |
| 2,784,112 A | 3/1957 | Nicholson |

(Continued)

FOREIGN PATENT DOCUMENTS

| CA | 2421032 | 4/2002 |
| CN | 2700346 | 5/2005 |

(Continued)

OTHER PUBLICATIONS

U.S. Appl. No. 15/795,619, Dec. 31, 2018, Office Action.

(Continued)

*Primary Examiner* — Noah S Wiese
(74) *Attorney, Agent, or Firm* — Workman Nydegger; Matthew D. Todd (57) ABSTRACT

Ceramic composite materials that are reinforced with carbide fibers can exhibit ultra-high temperature resistance. For example, such materials may exhibit very low creep at temperatures of up to 2700° F. (1480° C.). The present composites are specifically engineered to exhibit matched thermodynamically stable crystalline phases between the materials included within the composite. In other words, the reinforcing fibers, a debonding interface layer disposed over the reinforcing fibers, and the matrix material of the composite may all be of the same crystalline structural phase (all hexagonal), for increased compatibility and improved properties. Such composite materials may be used in numerous applications.

31 Claims, 4 Drawing Sheets

(51) Int. Cl.
| | |
|---|---|
| *C04B 35/591* | (2006.01) |
| *C04B 37/00* | (2006.01) |
| *C04B 35/628* | (2006.01) |
| *C04B 35/571* | (2006.01) |
| *C04B 38/00* | (2006.01) |
| *C04B 35/589* | (2006.01) |
| *C04B 111/00* | (2006.01) |

(52) U.S. Cl.
CPC .......... *C04B 35/589* (2013.01); *C04B 35/591* (2013.01); *C04B 35/62863* (2013.01); *C04B 35/62865* (2013.01); *C04B 35/62868* (2013.01); *C04B 35/62897* (2013.01); *C04B 37/005* (2013.01); *C04B 38/00* (2013.01); C04B 2111/0081 (2013.01); C04B 2111/00362 (2013.01); C04B 2111/00431 (2013.01); C04B 2111/00793 (2013.01); C04B 2111/00801 (2013.01); C04B 2111/00862 (2013.01); *C04B 2235/383* (2013.01); *C04B 2235/386* (2013.01); *C04B 2235/3865* (2013.01); *C04B 2235/3882* (2013.01); *C04B 2235/524* (2013.01); *C04B 2235/526* (2013.01); *C04B 2235/5244* (2013.01); *C04B 2235/5248* (2013.01); *C04B 2235/5264* (2013.01); *C04B 2235/5292* (2013.01); *C04B 2235/5296* (2013.01); *C04B 2235/5436* (2013.01); *C04B 2235/767* (2013.01); *C04B 2235/80* (2013.01); *C04B 2235/9607* (2013.01)

(58) Field of Classification Search
CPC ........ C04B 2235/383; C04B 2235/524; C04B 2235/767; C04B 2235/5244; C04B 2235/386; C04B 2235/3865
See application file for complete search history.

(56) References Cited

U.S. PATENT DOCUMENTS

| | | | |
|---|---|---|---|
| 3,028,256 A | 4/1962 | Simnad | |
| 3,175,884 A | 3/1965 | Kuhn | |
| 3,246,950 A | 4/1966 | Gruber | |
| 3,369,920 A | 2/1968 | Bourdeau et al. | |
| 3,386,840 A | 6/1968 | Gruber | |
| 3,415,625 A | 12/1968 | Babl et al. | |
| 3,427,222 A | 2/1969 | Biancheria et al. | |
| 3,447,952 A | 6/1969 | Hertl | |
| 3,488,291 A | 1/1970 | Hardy et al. | |
| 3,519,472 A | 7/1970 | Dyne et al. | |
| 3,535,080 A | 10/1970 | Van Der Pyl | |
| 3,725,533 A | 4/1973 | Economy et al. | |
| 3,764,550 A | 10/1973 | Block et al. | |
| 3,808,087 A | 4/1974 | Milewski et al. | |
| 3,813,340 A | 5/1974 | Knippenberg et al. | |
| 3,825,469 A | 7/1974 | Economy et al. | |
| 3,925,151 A | 12/1975 | Klepfer | |
| 3,932,594 A | 1/1976 | Gortsema | |
| 4,008,090 A | 2/1977 | Miyake et al. | |
| 4,013,503 A | 3/1977 | Knippenberg et al. | |
| 4,022,662 A | 5/1977 | Gordon et al. | |
| 4,107,276 A | 8/1978 | Schwetz et al. | |
| 4,141,948 A | 2/1979 | Laskow et al. | |
| 4,158,687 A | 6/1979 | Yajima et al. | |
| 4,209,334 A | 6/1980 | Panzera | |
| 4,225,355 A | 9/1980 | Galasso et al. | |
| 4,284,612 A | 8/1981 | Horne, Jr. et al. | |
| 4,294,788 A | 10/1981 | Laskow et al. | |
| 4,406,012 A | 9/1983 | Gordon et al. | |
| 4,445,942 A | 5/1984 | Cheng et al. | |
| 4,473,410 A | 9/1984 | Grubb et al. | |
| 4,566,700 A | 1/1986 | Shiembob | |
| 4,626,461 A | 12/1986 | Prewo et al. | |
| 4,707,330 A | 11/1987 | Ferrari | |
| 4,731,298 A | 3/1988 | Shindo | |
| 4,749,556 A | 6/1988 | Parrish et al. | |
| 4,756,895 A | 7/1988 | Boecker et al. | |
| 4,770,935 A | 9/1988 | Yamaura et al. | |
| 4,784,839 A | 11/1988 | Bachelard et al. | |
| 4,784,978 A | 11/1988 | Ogasawara et al. | |
| 4,851,375 A | 7/1989 | Newkirk et al. | |
| 4,853,196 A | 8/1989 | Koshida et al. | |
| 4,859,503 A | 8/1989 | Bouix et al. | |
| 4,864,186 A | 9/1989 | Milewski et al. | |
| 4,889,686 A | 12/1989 | Singh et al. | |
| 4,894,203 A | 1/1990 | Adamson | |
| 4,908,340 A | 3/1990 | Frechette et al. | |
| 4,921,725 A | 5/1990 | Bouix et al. | |
| 4,948,573 A | 8/1990 | Nadkarni et al. | |
| 4,948,763 A | 8/1990 | Hayashida et al. | |
| 4,963,286 A | 10/1990 | Coyle et al. | |
| 4,971,673 A | 11/1990 | Weisweiler et al. | |
| 4,988,564 A | 1/1991 | D'Angelo et al. | |
| 5,020,584 A | 6/1991 | Aghajanian et al. | |
| 5,026,604 A | 6/1991 | Thebault | |
| 5,063,107 A | 11/1991 | Birchall et al. | |
| 5,067,999 A | 11/1991 | Streckert et al. | |
| 5,068,154 A | 11/1991 | Mignani et al. | |
| 5,116,679 A | 5/1992 | Nadkarni et al. | |
| 5,135,895 A | 8/1992 | Frechette et al. | |
| 5,182,077 A | 1/1993 | Feinroth | |
| 5,190,737 A | 3/1993 | Weimer et al. | |
| 5,202,105 A | 4/1993 | Boecker et al. | |
| 5,230,848 A | 7/1993 | Wallace et al. | |
| 5,238,711 A | 8/1993 | Barron et al. | |
| 5,254,142 A | 10/1993 | Johansson et al. | |
| 5,268,946 A | 12/1993 | Bryan et al. | |
| 5,275,984 A | 1/1994 | Carpenter et al. | |
| 5,294,489 A * | 3/1994 | Luthra | B32B 18/00 428/366 |
| 5,304,397 A | 4/1994 | Holzl et al. | |
| 5,324,494 A | 6/1994 | Glatzmier | |
| 5,330,838 A | 7/1994 | Dyer et al. | |
| 5,336,350 A * | 8/1994 | Singh | C04B 35/565 156/155 |
| 5,340,417 A | 8/1994 | Weimer et al. | |
| 5,354,527 A | 10/1994 | Frechette et al. | |
| 5,364,660 A | 11/1994 | Gabor et al. | |
| 5,366,943 A | 11/1994 | Lipowitz et al. | |
| 5,368,938 A | 11/1994 | Holzl et al. | |
| 5,383,228 A | 1/1995 | Armijo et al. | |
| 5,404,836 A | 4/1995 | Milewski | |
| 5,434,897 A | 7/1995 | Davies | |
| 5,436,042 A | 7/1995 | Lau et al. | |
| 5,449,421 A | 9/1995 | Hamajima et al. | |
| 5,460,637 A | 10/1995 | Connolly et al. | |
| 5,501,906 A | 3/1996 | Deve | |
| 5,547,512 A | 8/1996 | Gabor et al. | |
| 5,552,352 A | 9/1996 | Brun et al. | |
| 5,602,062 A | 2/1997 | Sato et al. | |
| 5,618,510 A | 4/1997 | Okada et al. | |
| 5,676,918 A | 10/1997 | Okada et al. | |
| 5,814,840 A | 9/1998 | Woodall et al. | |
| 5,922,300 A | 7/1999 | Nakajima et al. | |
| 5,962,103 A | 10/1999 | Luthra et al. | |
| 5,997,832 A | 12/1999 | Lieber et al. | |
| 6,022,515 A | 2/2000 | Stole et al. | |
| 6,024,898 A | 2/2000 | Steibel et al. | |
| 6,030,698 A | 2/2000 | Burchell et al. | |
| 6,040,008 A | 3/2000 | Sacks | |
| 6,110,279 A | 8/2000 | Kito et al. | |
| 6,113,982 A | 9/2000 | Claar et al. | |
| 6,261,509 B1 | 7/2001 | Barnard et al. | |
| 6,270,573 B1 | 8/2001 | Kitabatake et al. | |
| 6,316,051 B2 | 11/2001 | Okada | |
| 6,322,889 B1 | 11/2001 | Lara-Curzio et al. | |
| 7,041,266 B1 | 5/2006 | Angier et al. | |
| 7,083,771 B2 | 8/2006 | Angier et al. | |
| 7,125,514 B2 | 10/2006 | Okamura et al. | |
| 7,297,368 B2 | 11/2007 | Williams | |
| 7,341,702 B2 | 3/2008 | Pultz et al. | |
| 7,687,016 B1 | 3/2010 | DiCarlo et al. | |
| 7,700,202 B2 | 4/2010 | Easler et al. | |

(56) References Cited

U.S. PATENT DOCUMENTS

| | | | |
|---|---|---|---|
| 8,940,391 B2* | 1/2015 | Garnier | B82Y 30/00 |
| | | | 428/398 |
| 9,199,227 B2 | 12/2015 | Garnier et al. | |
| 9,272,913 B2 | 3/2016 | Garnier et al. | |
| 9,275,762 B2 | 3/2016 | Garnier et al. | |
| 9,803,296 B2* | 10/2017 | Garnier | C04B 35/565 |
| 10,464,849 B2 | 11/2019 | Pope | |
| 2002/0033545 A1 | 3/2002 | Marlowe | |
| 2002/0058107 A1 | 5/2002 | Fareed et al. | |
| 2004/0126306 A1 | 7/2004 | Ochiai et al. | |
| 2005/0181192 A1* | 8/2005 | Steffier | B32B 18/00 |
| | | | 428/293.4 |
| 2006/0039524 A1 | 2/2006 | Feinroth et al. | |
| 2006/0051281 A1 | 3/2006 | Pradham et al. | |
| 2006/0140838 A1 | 6/2006 | Pultz et al. | |
| 2006/0227924 A1 | 10/2006 | Hallstadius et al. | |
| 2007/0064861 A1 | 3/2007 | Sterbentz | |
| 2007/0138706 A1 | 6/2007 | Metzger et al. | |
| 2007/0248760 A1 | 10/2007 | Chmelka et al. | |
| 2009/0032178 A1 | 2/2009 | Feinroth | |
| 2009/0318280 A1 | 12/2009 | Mohammadi et al. | |
| 2010/0120604 A1 | 5/2010 | Easler et al. | |
| 2011/0135558 A1 | 6/2011 | Ma et al. | |
| 2012/0087457 A1 | 4/2012 | Garnier et al. | |
| 2012/0088088 A1* | 4/2012 | Garnier | B82Y 30/00 |
| | | | 428/292.1 |
| 2013/0010914 A1 | 1/2013 | Garnier et al. | |
| 2013/0010915 A1 | 1/2013 | Garnier et al. | |
| 2013/0048903 A1 | 2/2013 | Garnier et al. | |
| 2016/0012252 A1 | 5/2016 | Garnier et al. | |
| 2018/0051396 A1 | 2/2018 | Garnier et al. | |

FOREIGN PATENT DOCUMENTS

| | | |
|---|---|---|
| EP | 0603888 | 6/1994 |
| JP | 50038700 | 4/1975 |
| JP | 06192917 | 7/1994 |
| JP | 2010143771 | 7/2010 |
| WO | 9515564 | 6/1995 |
| WO | 2009046293 | 7/2004 |
| WO | 2012048066 | 4/2012 |
| WO | 2012048071 | 4/2012 |
| WO | 2013070293 | 5/2013 |
| WO | 2014049221 | 9/2013 |

OTHER PUBLICATIONS

"Abradable Coatings used for Gas Path Seals in Turbine Engines." Vac Aero International, Inc. Web. Accessed Dec. 3, 2014. http://vacaero.com/information-resources/vac-aero-news-and-training/products-news-training/633-abradable-coatings-for-gas-path-seals-in-turbine-engines.html.

Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.

"An Innovative Ceramic Corrosion Protection System for Zircaloy Cladding," Year 3—4th Quarter Report (+6), NERI Research Project No. DE-FG03-995F21882, Feb. 2003.

Belitskus, David, "Fiber and Whisker Reinforced Ceramics for Structural Application", Technology & Engineering, pp. 81-83 and 86-90, 1993.

Bye et al., "Occurrence of airborne silicon carbide fibers during industrial production of silicon carbide," Scand J. Work Environ health 11 (1985) 111-15.

"Ceramic Fibers and Coatings: Advanced Materials for the Twenty-First Century" The National Academies Press, 1998, Chapter 6: Interfacial Coatings.

Chambers et al., "Development and Testing of PRD-66 Hot Gas Filters," DOE/ME/31214-97/C0734, Advanced Coal-Fired Power Systems '96 Review Meeting, Morgantown, West Virginia, Jul. 16-18, 1996, 8 pages.

Dacic et al., "Thermodynamics of gas phase carbothermic reduction of boron-anhydride," Journal of Alloyes and Compounds 413 (2006) 198-205.

Ding, et al. "Dip-coating of boron nitride interphase and its effects on mechanical properties of SiCf/SiC composites" Materials Science and Engineering A, 2012.

Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.

Haibo et al., "Synthesis of a silicon carbide coating on carbon fibers by deposition of a layer of pyrolytic carbon and reacting it with silicon monoxide," Carbon 46 (2008) 1339-1344.

"Hexoloy SA Silicon Carbide, Technical Data," Saint-Gobain Advanced Ceramics, 2003, 4 pages.

"Hi-Nicalon Ceramic Fiber," COI Ceramics, Inc., Jan. 2006, 2 pages.

"Hi-Nicalon Type S Ceramic Fiber," COI Ceramics, Inc., Jan. 2006, 2 pages.

"High Performance Synthetic Fibers for Composites," National Materials Advisory Board, Commission on Engineering and Technical Systems, National Research Council, Publication NMAB-458, Apr. 1992, 142 pages.

Jayaseelan et al., "In Situ Formation of Silicon Carbide Nanofibers on Cordierite Substrates," J. Am. Ceram. Soc., 90 [5] 1603-1060 (2007).

Low, "Advances in Ceramic Matrix Composites" Jan. 20, 2018 pp. 12-15.

Milewski, "Growth of Beta-Silicon Carbide Whiskers by the VLS Process", Journal of Materials Science 20, 1985, pp. 1160-1166.

Mortensen, Andrew, "Concise Encyclopedia of Composite Materials", Technology & Engineering, pp. 866-869, Dec. 8, 2003.

Naslain, et al. "Fiber-Reinforced Ceramic Matrix Composites: State of the Art, Challenge and Perspective" Kompozyty (Composites) 5(2005)1, France.

Okada et el., "Preparation of Silicon Carbide Fiber from Activated Carbon Fiber and Gaseous Silicon Monoxide", Ceramic Engineering & Science Proceedings, 1995, pp. 45-54.

Okada et el., "Preparation of Silicon Carbide Fiber from Activated Carbon Fiber and Gaseous Silicon Monoxide", Communications of the American Ceramic Society, Jun. 1994, pp. 1691-1693.

PCT International Search Report and Written Opinion of the International Searching Authority for PCT/US11/55025, dated Feb. 27, 2012, 7 pages.

PCT International Search Report and Written Opinion of the International Searching Authority for PCT/US11/55031, dated Feb. 13, 2012, 10 pages.

PCT International Search Report and Written Opinion of the International Searching Authority for PCT/US12/50736, dated Jun. 10, 2013, 4 pages.

Ryan et al., "The Conversion of Cubic to Hexagonal Silicon Carbide as a Function of Temperature and Pressure" USAF, 1967.

Sacks, et al. "Silicon Carbide Fibers with Boron Nitride Coatings" in 24th Annual Conference on Composites, Advanced Ceramics, Materials, and Structures—B, Sep. 28, 2009, pp. 275-277.

Schricker, Bob, "Using Fiber Metal Abradable Seals in Aerospace Turbine Applications." Defense Tech Briefs. Technetics Group, EnPro Industries companies, Oct. 1, 2011. Web. Accessed Dec. 3, 2014. https://www.technet icsgroup.com/bin/AbradableSeals_AerospaceApplications.pdf.

Shi, et al. "Synthesis of Few-Layer Hexagonal Boron Nitride Thin Film by Chemical Vapor Deposition" American Chemical Society, 2010, vol. 10, pp. 4134-4139.

"Sylramic SiC Fiber," COI Ceramics, Inc., Jan. 2006, 2 pages.

"UBE Tyranno Fibers," Engineering Ceramics, 2005, 3 pages.

Wang, et al. "KD-S SiCf/SiC composites with BN interface fabricated by polymer infiltration and pyrolysis process" Journal of Advanced Ceramics, 2018, 7(2).

Wikipedia entry, "Activated Carbon", http://en.wikipedia.org/wiki/Activated_carbon, Accessed Sep. 25, 2013, 15 pages.

Wikipedia entry, "Vapor-liquid-solid method", http://en.wikipedia.org/wiki/Vapor-Liquid-Solid<method, Accessed Oct. 9, 2013, 7 pages.

(56) References Cited

OTHER PUBLICATIONS

Wilson, Scott, "Ensuring Tight Seals", Sulzer Innotec Abradable Test Facility. Sulzer Innotec, Feb. 2007. Web. Accessed Dec. 3, 2014. http://www.sulzer.com/en/-/media/Documents/Cross_Division/STR/2007/2007_2_23_wilson_e.pdf.
Wing "Residual Stresses and Oxidation of Silicon Carbide Fiber Reinforced Silicon Carbide Composites" A dissertation, University of Michigan, 2016.
Yang, et al., "Microstructure and Mechanical Properties of C/CeZrCeSiC Composites Fabricated by Reactive Melt Infiltration with Zr, Si Mixed Powders" in the Journal of Material Science Technologies, Aug. 2013, vol. 29, Issue 8, pp. 702-710.
U.S. Appl. No. 12/901,309, Apr. 20, 2011, Restriction Requirement.
U.S. Appl. No. 12/901,309, Jun. 13, 2011, Office Action.
U.S. Appl. No. 12/901,309, Oct. 27, 2011, Final Office Action.
U.S. Appl. No. 12/901,309, Jan. 12, 2012, Advisory Action.
U.S. Appl. No. 12/901,309, Apr. 2, 2012, Office Action.
U.S. Appl. No. 13/215,967, Mar. 29, 2013, Restriction Requirement.
U.S. Appl. No. 12/901,309, Apr. 16, 2013, Final Office Action.
U.S. Appl. No. 13/215,967, Apr. 25, 2013, Office Action.
U.S. Appl. No. 12/901,326, Aug. 12, 2013, Restriction Requirement.
U.S. Appl. No. 12/901,309, Nov. 7, 2013, Office Action.
U.S. Appl. No. 12/901,326, Nov. 18, 2013, Office Action.
U.S. Appl. No. 13/215,967, Jan. 3, 2014, Final Office Action.
U.S. Appl. No. 12/901,309, Jun. 30, 2014, Office Action.
U.S. Appl. No. 12/901,326, Sep. 11, 2014, Final Office Action.
U.S. Appl. No. 12/901,309, Sep. 16, 2014, Notice of Allowance.
U.S. Appl. No. 13/215,967, Apr. 24, 2015, Office Action.
U.S. Appl. No. 12/901,326, May 15, 2015, Office Action.
U.S. Appl. No. 13/215,967, Jul. 29, 2015, Notice of Allowance.
U.S. Appl. No. 14/570,927, Oct. 20, 2015, Notice of Allowance.
U.S. Appl. No. 12/901,326, Oct. 26, 2015, Notice of Allowance.
U.S. Appl. No. 14/615,685, Jan. 26, 2017, Office Action.
U.S. Appl. No. 14/615,685, Jun. 30, 2017, Notice of Allowance.
U.S. Appl. No. 14/954,518, Aug. 30, 2017, Office Action.
U.S. Appl. No. 14/954,518, May 18, 2018, Office Action.
International Search Report and Written Opinion issued in PCT/US2018/041627 dated Sep. 26, 2018.
Baskaran, et al. "Fibrous Monolithic Ceramics: III, Mechanical Properties and Oxidation Behavior of the Silicon Carbide/Boron Nitride System" Journal of the American Ceramic Society, vol. 77, Issue 5, May 1994, pp. 1249-1255.
Chen, et al. "Carbothermal Synthesis of Boron Nitride Coatings on Silicon Carbide" Journal of American Ceramic Society. Dec. 20, 2004.
Das, et al. "Carbothermal synthesis of boron nitride coating on PAN carbon fiber" Journal of the European Ceramic Society, vol. 29, Issue 10, Jul. 2009, pp. 2129-2134.
Dicarlo, et al. "SiC/SiC Composites for 1200 C and Above" Nasa/TM, Dec. 2004.
Frueh, et al. "Carbon fiber reinforced ceramic matrix composites with an oxidation resistant boron nitride interface coating" Ceramics International, May 21, 2018.
Han "Anisotropic Hexagonal Boron Nitride Nanomaterials: Synthesis and Applications" Nanotechnologies for the Life Sciences, Oct. 2010.
Lamouroux, et al. "Oxidation-resistant carbon-fiber-reinforced ceramic-matrix composites" Composites Science and Technology, vol. 59, Issue 7, May 1999, pp. 1073-1085.
Li, et al. "Boron nitride coatings by chemical vapor deposition from borazinc" Surface and Coatings Technology, Mar. 2011, 205(12) pp. 3736-3741.
Li, et al. "Preparation and characterization of boron nitride coatings on carbon fibers from borazine by chemical vapor deposition" Applied Surface Science, vol. 257, Issue 17, Jun. 15, 2011, pp. 7752-7757.
Liu, et al. "Borazine derived porous boron nitride—boron nitride composites fabricated by precursor infiltration and pyrolysis" Ceramics International, 40(7) pp. 9235-9240.
McFarland, et al. "Boric Fluxing of SiC in Ceramic Matrix Composite Aeropropulsion Applications" The Electrochemical Society, 2015.
Mu, et al. "Effects of BN/SiC dual-layer interphase on mechanical and dielectric properties of SiCf/SiC composites" Ceramics International, Mar. 2014, 40(2), pp. 3411-3418.
Opila, "Oxidation and Volatilization of SiC in a Hydrogen-Rich Rocket Engine Environment" The Electrochemical Society, 2007.
Opila, et al. "High Temperature Degradation of BN-Coated SiC Fibers in Ceramic Matrix Composites" The Electrochemical Society, 2011.
Opila, et al. "Hot Corrosion of SiC/BN/SiC Composites" The Electrochemical Society, 2015.
Opila, et al. "Molten Salt Corrosion of SiC Fibers" The Electrochemical Society, 2016.
Sabelkin, et al. "Fatigue and creep behaviors of a SiC/SiC composite under combustion and laboratory environments" Journal of Composite Materials, Aug. 27, 2015.
Sabelkin et al. "High-temperature thermal barrier-coated Sylramic-iBN/pyrolytic carbon/chemical vapor infiltration silicon carbide ceramic matrix composite behavior in a combustion environment" Journal of Composite Materials, Aug. 10, 2017.
Shen, et al. "Characterization of Dip-Coated Boron Nitride on Silicon Carbide Fibers" Journal of the American Ceramic Society, Apr. 1994.
Solozhenko, et al. "Refined Phase Diagram of Boron Nitride" Journal of Physical Chemistry B, 1999, vol. 103 pp. 2903-2905.
Suzuki, et al. "Uniformization of Boron Nitride Coating Thickness by Continuous Chemical Vapor Deposition Process for Interphase of SiC/SiC Composites" Journal of the Ceramic Society of Japan, vol. 111, No. 12, pp. 865-871, 2003.
Wei, et al. "Synthesis of BN coatings on carbon fiber by dip coating" Surface and Interface Analysis, Jul. 29, 2016.
Yang, et al. "Processing-temperature dependent micro- and macro-mechanical properties of SiC fiber reinforced SiC matrix composites" Composites Part B: Engineering, vol. 129, Nov. 15, 2017, pp. 152-161.
Zhou, et al. "Effects of dip-coated BN interphase on mechanical properties of SiCf/SiC composites prepared by CVI process" Transactions of Nonferrous Metals Society of China, May 2014, 24(5), pp. 1400-1406.
U.S. Appl. No. 16/261,246, filed Jan. 29, 2019, Garnier, et al.
Chiu et al. "SiC nanowires in large quantities: Synthesis, band gap characterization, and photoluminescence properties" Journal of Crystal Growth, 311 (2009) pp. 1036-1041.
Abstract Only Han et al. "Continuous synthesis and characterization of silicon carbide nanorods" Chemical Physics Letters, vol. 265, Issues 3-5, Feb. 7, 1997, pp. 374-378.
Legba "Synthesis and Characterization of a-Silicon Carbide Nanostructures" University of Kentucky Master's Theses 2007.
Li, et al. "Silicon-based Nanomaterials" Springer Series in Materials Science vol. 187, 2013.
Abstract Only Sun et al. "Formation of Silicon Carbide Nanotubes and Nanowires via Reaction of Silicon (from Disproportionation of Silicon Monoxide) with Carbon Nanotubes" J. Am. Chem. Soc. 2002, 124(48), pp. 14464-14471.
Tan et al. "Properties of Silicon Carbide Nanotubes formed via Reaction of SiO Powder with SWCNTs and MWCNTs" IEEE Southeastcon 2009, Mar. 5-8, 2009.
Zhang et al. "Synthesis and Characterization of Crystalline Silicon Carbide Nanoribbons" Nanoscale Res. Lett. (2010) 5:1264-1271.

* cited by examiner

SINGLE PHASE FIBER REINFORCED CERAMIC MATRIX COMPOSITES

CROSS-REFERENCE TO RELATED APPLICATIONS

This application claims priority to and the benefit of U.S. Provisional Patent Application Ser. No. 62/556,664 filed on Sep. 11, 2017, which is herein incorporated by reference in its entirety.

The present application is also subject matter related to the following patents and patent applications of Applicant: U.S. Pat. No. 8,940,391 entitled "SILICON CARBIDE FIBERS AND ARTICLES INCLUDING SAME"; U.S. Pat. No. 9,272,913 entitled "METHODS FOR PRODUCING SILICON CARBIDE FIBERS"; U.S. Pat. No. 9,275,762 entitled "CLADDING MATERIAL, TUBE INCLUDING SUCH CLADDING MATERIAL, AND METHODS OF FORMING THE SAME"; U.S. Pat. No. 9,199,227 entitled "METHODS OF PRODUCING CONTINUOUS BORON CARBIDE FIBERS"; U.S. Pat. No. 9,803,296, entitled "METAL CARBIDE FIBERS AND METHODS FOR THEIR MANUFACTURE"; U.S. patent application Ser. No. 15/795,619, entitled "COMPOSITE ARTICLES COMPRISING METAL CARBIDE FIBERS"; and U.S. patent application Ser. No. 14/954,518, entitled "BORON CARBIDE FIBER REINFORCED ARTICLES". The disclosure of each of the above patents and applications is herein incorporated by reference in its entirety.

STATEMENT REGARDING FEDERALLY SPONSORED RESEARCH OR DEVELOPMENT

This invention was made with government support under Contract Numbers N000-14-14-P-1130 and N000-14-16-C-2020 awarded by the United States Department of the Navy, Office of Naval Research. The government has certain rights in the invention.

BACKGROUND OF THE INVENTION

1. The Field of the Invention

The disclosure, in various embodiments, relates generally to methods of producing fiber reinforced composites, particularly fiber-reinforced ceramic composites, in which the hexagonal crystalline phases of the components of the composite are matched to one another. The disclosure also relates to articles produced by such methods.

2. The Relevant Technology

While fiber reinforced composite materials are generally known, there exist numerous difficulties and limitations with such composites, limiting the fields and conditions in which they can be employed. For example, such limitations exist at least with respect to high temperature thermodynamic stability (heat resistance), creep resistance, and It would be desirable to produce fiber-reinforced composite materials which exhibit improved characteristics of high temperature resistance, decreased creep, and other characteristics that would broaden the environments in which such composite materials could be employed. It would be a further advantage to provide methods of manufacture which would allow relatively inexpensive manufacture of such composite materials.

BRIEF SUMMARY

An embodiment of the present disclosure is directed towards a composite in which the constituents of the composite are crystalline phase-matched (e.g., they each include a hexagonal structure). Such a composite may include reinforcing hexagonal phase-based carbide fibers disposed within a matrix of a hexagonal phase-based material (e.g., hexagonal SiC and/or hexagonal silicon nitride (e.g., $Si_3N_4$), where the reinforcing hexagonal carbide fibers may not directly contact the matrix material, but include a hexagonal crystalline-based interface coating disposed over the reinforcing hexagonal carbide fibers. In other words, the hexagonal interface coating, the hexagonal carbide fibers, and the hexagonal material of the matrix may all include hexagonal crystalline phase structures.

In an embodiment, the reinforcing hexagonal carbide fibers may comprise carbon fibers in which a portion of the exterior of the carbon fiber has been converted to a metal carbide material, so that the fibers comprise a carbon core with a converted layer of hexagonal carbide material (in fiber form) disposed over the carbon fiber core. In an embodiment, the carbide material of the hexagonal carbide fibers may comprise silicon carbide, particularly alpha silicon carbide, which has a hexagonal structure. Methods for producing such partially converted fibers are described in Applicant's earlier patents and applications, already incorporated by reference above.

In an embodiment, the reinforcing hexagonal carbide fibers may comprise polycrystalline hexagonal silicon carbide.

In an embodiment, the hexagonal interface coating may comprise a hexagonal nitride, such as hexagonal boron nitride, hexagonal aluminum nitride, and/or hexagonal molybdenum nitride.

The hexagonal material of the matrix may comprise the same material as the conversion layer of the carbide fiber (e.g., alpha silicon carbide). Such alpha silicon carbide matrix may be formed by providing a pre-ceramic polymer, which may be seeded with the desired alpha (hexagonal) silicon carbide material (e.g., in powder, platelet, whisker, chopped fiber, single crystal, or other form). Upon heating the pre-ceramic polymer, because of the presence of the seed material, the pre-ceramic polymer material converts into hexagonal silicon carbide by templating the same crystalline form in the presence of the seed material. The presence of the hexagonal nitride (e.g., boron nitride) interface coating during transformation of the pre-ceramic polymer to the ceramic matrix may also aid in ensuring that the resulting matrix is of the desired hexagonal structure (e.g., alpha silicon carbide).

Another embodiment is directed to articles which may comprise such composites. Such composite materials may be used in (e.g., comprise at least a portion of) one or more of an engine (e.g., vanes of a turbine), a heat exchanger, gas separation membrane, catalyst support, filter, nuclear fuel containment, fusion reactor component, heat shield, jet vane, space structure stabilization, chemical liner, body frame, brake pad, body armor, vehicle armor, structural member, sporting good, drill bit, wear bit, hypersonic missile, or rocket component. It will be apparent that the foregoing listing is non-exhaustive, and numerous other possible uses for such composite materials are also possible.

Another embodiment is directed to methods for preparing such composite materials. For example, such a process may include forming or otherwise providing the reinforcing hexagonal carbide fibers (e.g., partially converted carbon fibers, where an outer portion of the carbon fiber has been converted to alpha silicon carbide or another desired carbide). A hexagonal interface coating (e.g., a hexagonal nitride) may be formed over the reinforcing fibers. The fibers may be dispersed or otherwise positioned within a matrix of the hexagonal material. Such may be achieved by positioning the fibers in a matrix of a pre-ceramic polymer, which can be transformed (e.g., through heat treatment) to the desired ceramic. The pre-ceramic polymer may be seeded with hexagonal single crystals, platelets, particles, whiskers, chopped fibers, or powder, in order to cause the pre-ceramic polymer to "template" off the hexagonal seed material during transformation, so that upon transformation to the ceramic matrix, the pre-ceramic polymer assumes the desired hexagonal ceramic structure (e.g., alpha silicon carbide, or hexagonal silicon nitride, or other hexagonal matrix material).

These and other advantages and features of the present invention will become more fully apparent from the following description and appended claims, or may be learned by the practice of the invention as set forth hereinafter.

BRIEF DESCRIPTION OF THE DRAWINGS

While the specification concludes with claims particularly pointing out and distinctly claiming that which is regarded as the present invention, the advantages of embodiments of the disclosure may be more readily ascertained from the following description when read in conjunction with the accompanying drawings.

DETAILED DESCRIPTION OF THE PREFERRED EMBODIMENTS

I. Definitions

All publications, patents and patent applications cited herein are hereby incorporated by reference in their entirety to the same extent as if each individual publication, patent or patent application was specifically and individually indicated to be incorporated by reference. For example, any of the conditions or starting materials described in the inventor's earlier applications, already referenced, may be adapted for use according to the methods, metal carbide fibers, or articles disclosed herein.

Numbers, percentages, or other values stated herein are intended to include that value, and also other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Furthermore, the terms "substantially", "about" or "approximately" as used herein represents an amount close to the stated amount that still performs a desired function or achieves a desired result. For example, the term "substantially" "about" or "approximately" may refer to an amount that is within 10% of, within 5% of, within 1% of, within 0.1% of, and within 0.01% of a stated amount or value.

Ranges between any values disclosed herein are contemplated and within the scope of the present disclosure (e.g., a range defined between any two values (including end points of a disclosed range) given as exemplary for any given parameter).

As used in this specification and the appended claims, the singular forms "a," "an" and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

II. Introduction

The present disclosure relates to ceramic composite materials that are reinforced with metal carbide/carbon fibers, which can exhibit ultra-high temperature resistance. For example, such fibers and/or composite materials may exhibit very low creep (e.g., from $10^{-11}$ to $10^{-8}$ m/s or better at load levels from 30 to 300 MPa) at temperatures of up to 2700° F. (1480° C.), or up to 2900° F. (e.g., 1600° C.), for at least 1 hour under such conditions. Thermodynamic phase stability may be possible at far higher temperatures, e.g., up to 2400° C., as all components of the composite have very high melting points and maintain their respective hexagonal phases. Such characteristics compare very favorably to existing polycrystalline fiber reinforcement, e.g., which may have creep rates that are at least 2-4 orders of magnitude greater at similar temperatures and loads. The present composites are specifically engineered to exhibit matched crystalline phases between the materials included within the composite. In other words, the reinforcing fibers, a debonding or environmental interface layer disposed over the reinforcing fibers, and the matrix material of the composite may all be of the same crystalline structural phase, for increased compatibility (e.g., all are hexagonal). Such increased temperature resistance may allow such composite materials to be used in numerous applications, providing improved characteristics to articles formed therefrom.

III. Exemplary Composites and Methods of Preparation

Existing state-of-the-art fiber-reinforced ceramic composites have good long-term stability at elevated temperatures in range of 1000° C. to 1300° C. but are not suitable for long term uses at higher temperatures, such as above 1300° C. The remarkable toughness demonstrated by some ceramic composites is dependent upon deflection of matrix cracks into the fiber-reinforced matrix. A debonding layer may primarily serve to deflect cracks that may form within the matrix. The "weak" bond between the interface and the matrix prevents a crack from traveling "through" the debond interface layer, penetrating the fibers. This provides "toughness" (damage tolerance) to the composite.

The presence of a pyrolitic carbon coating or a gaseous vapor deposited BN coating (in either a hexagonal or turbostratic crystalline form) on the reinforcing fibers can aid in promoting crack deflection. Unfortunately, these coatings have limited oxidation resistance unless the surrounding ceramic matrix can also be kept in a crack-free state to inhibit ingress of external environmental gases such as oxygen. In most applications, the high strength and low coefficient-of-thermal expansion characteristics common to carbon fiber help prevent formation of micro-cracks under thermal and mechanical loading. As noted above, existing ceramic composites are only suitable for use at relatively low temperatures and/or stress levels, due to risk of formation of micro-cracks within the matrix.

Applicant has discovered that by using metal carbide fibers such as those recently developed by Applicant and described in the above referenced patents and applications, improved ceramic composites may be achieved. For example, such fibers (particularly those which have only been partially converted to metal carbide) at high processing temperatures exhibit low coefficient-of-thermal expansion similar to that of the carbon core, and excellent thermal stability. Such fiber stability will aid in maintaining the ceramic matrix in a compressive state as the coefficient-of-thermal expansion of the fiber may be less than the surrounding matrix. Such is particularly true in an alpha SiC matrix. This compression reduces the potential for matrix micro-cracking due to the effects of thermal and mechanical induced stressors and impact to provide an additional margin of composite performance utility and safety.

While metal carbide coatings have been formed on substrates using various other processing techniques, such techniques and products have been prohibitively expensive and complex. For example, metal carbide coatings have been formed by physical and chemical deposition techniques, such as pulsed laser deposition, reactive laser ablation, ultrahigh vacuum sputter deposition, high current plasma discharge arc deposition, co-evaporation, chemical vapor deposition, electron beam deposition, and ion beam assisted deposition. Such processes are generally complex, expensive, the coatings formed encapsulate the individual carbon filaments in the fiber, and typically do not produce hexagonal crystalline phase forms of the desired metal carbides. Applicant's newly developed Direct Conversion Process™, described in the above referenced patents and applications, provides numerous advantages. The present embodiments advantageously employ such converted silicon carbide and/or other metal carbide fibers in the presently described fiber-reinforced, ceramic matrix composites (FRCMCs)

The invention relates to dense, FRCMCs whose constituents are each of matched crystalline phases which FRCMCs may be suitable for high temperature applications in inert, atmospheric (e.g., oxygen containing) and water containing environments. In particular, embodiments of the invention relate to use of hexagonal crystalline-phase metallic carbide/hexagonal graphene carbon-core fibers overcoated with a hexagonal phase boron nitride debond interface layer, where the fibers serve as reinforcing fibers within a hexagonal phase metallic carbide matrix.

The metal carbide fibers employed in such composites may be continuous tow, woven, unwoven, chopped, or any other various suitable fiber forms. Metal carbides exhibit beneficial properties, such as high hardness, high temperature stability, low electrical resistivity, and high resistance to corrosion and oxidation. Such properties would be useful in numerous applications, including, but not limited to engine components (e.g., turbine engine vanes), heat exchangers, gas separation membranes, catalyst supports, filters, nuclear fuel containments, fusion reactor components, heat shields, jet vanes, space structure stabilizations, chemical liners, body frames, brake pads, body armor, vehicle armor, structural members, sporting goods, drill bits, wear bits, hypersonic missiles, or rocket components.

While hexagonal, alpha silicon carbide fibers may typically be employed in many applications, numerous other hexagonal metal carbide fibers may be suitable for coating with a hexagonal nitride, and incorporation into a hexagonal ceramic matrix material. Any of such fibers may be used as reinforcing-fibers in a hexagonal phase-stable ceramic matrix of a hexagonal ceramic material (e.g., such as hexagonal silicon carbide or hexagonal silicon nitride) to make unique single-phase (i.e., matched polymorph phase—all hexagonal), FRCMCs. Depending on the application, a desired hexagonal metal carbide fiber may be selected.

By only partially converting a starting carbon fiber to the metal carbide (which metal carbide retains the fiber form of the carbon fiber starting material), the unconverted carbon core of many if not all such fibers retains its inherent carbon strength and thus imparts a high temperature creep resistance under thermal and mechanical loading which further reduces the formation of micro-cracks in the ceramic matrix, thereby increasing the performance utility of the composite material under mechanical and thermal loads. Such high temperature creep resistance is particularly true where the metal carbide is hexagonal alpha silicon carbide. Because of the silicon carbide or other metal carbide conversion layer, the fiber exhibits markedly improved high temperature creep resistance, even in the presence of oxygen (where unconverted carbon fiber will fail within minutes under such conditions).

The metal carbide fibers may be in any of various forms, including fibers. Examples of such forms into which fibers may be formed include any form into which carbon fiber can be formed, including, but not limited to bundles, tape, cloth, felt, as well as filaments, strands, whiskers, or the like. Fibers may be chopped or milled, e.g., so as to be discontinuous, of short length, or may be continuous, of relatively long length. It will be apparent that numerous forms are possible.

Examples of such metal carbide fibers are disclosed in the various patents and applications referenced above. Chemical reactions to form a hexagonal phase metal carbide on hexagonal (graphene) carbon fiber by Applicant's Direct Conversion Process™, as described in the above referenced patents and applications include those listed below in Table 1. Sixteen exemplary metal carbides include: silicon carbide (SiC), erbium carbide (ErC), ytterbium carbide (YbC), molybdenum carbide (MoC), tungsten carbide (WC), tantalum carbide ($Ta_2C$ which can also be written as $TaC_{0.5}$), niobium carbide ($Nb_2C$), vanadium carbide ($V_2C$), praseodymium carbide ($PrC_2$), neodymium carbide ($NdC_2$) and samarium carbide ($SmC_2$), scandium carbide ($ScC_2$), gadolinium carbide ($Gd_2C_2$), magnesium carbide ($Mg_2C_3$)chromium carbide ($Cr_7C_3$) and calcium carbide ($CaC_2$).

TABLE 1

Possible Hexagonal Metal Carbides on Carbon Fiber

| # | Hexagonal Metal Carbides | |
| --- | --- | --- |
| 1 | Silicon | SiC |
| 2 | Erbium | ErC |
| 3 | Ytterbium | YbC |
| 4 | Molybdenum | $Mo_2C$ |
| 5 | Tungsten | $W_2C$ |
| 6 | Tantalum | $Ta_2C$ |
| 7 | Niobium | $Nb_2C$ |

TABLE 1-continued

Possible Hexagonal Metal Carbides on Carbon Fiber

| # | Hexagonal Metal Carbides | |
|---|---|---|
| 8 | Vanadium | $V_2C$ |
| 9 | Praseodymium | $PrC_2$ |
| 10 | Neodymium | $NdC_2$ |
| 11 | Samarium | $SmC_2$ |
| 12 | Scandium | $ScC_2$ |
| 13 | Gadolinium | $Gd_2C_2$ |
| 14 | Magnesium | $Mg_2C_3$ |
| 15 | Chromium | $Cr_7C_3$ |
| 16 | Calcium | $CaC_2$ |

By way of example, calcium carbide is useful as a reducing agent. Rare earth carbides are useful in magnets, neutron capture masers, ceramic capacitors, battery electrodes, fluid catalytic cracking, hydrogen storage, mercury vapor lamps, and emitters in projection televisions. The rare earth metal cations that can form a hexagonal crystalline structure are: ytterbium (Yb), praseodymium (Pr), neodymium (Nd), samarium (Sm), gadolinium (Gd), erbium (Er), and scandium (Sc). The other listed metal carbide cations that can form a hexagonal phase when processed according to Applicant's Direct Conversion Process™ include molybdenum (Mo), tungsten (W), tantalum (Ta), niobium (Nb) vanadium (V), magnesium (Mg), chromium (Cr), and calcium (Ca). Until Applicant's Direct Conversion Process™, many if not all such metal carbides were not available in fiber form, based on a carbon fiber substrate, particularly with a hexagonal crystalline structure. Metal carbide fibers based on polyacrylonitrile (PAN), pitch, or other carbon filament cores will significantly expand metal carbide applications useful in aerospace, defense, industrial and nuclear fields.

The hexagonal form of the metal carbide (e.g., alpha silicon carbide in the case of SiC) results due to the particular processing conditions associated with Applicant's Direct Conversion Process™. Formation of this desired hexagonal form may also depend at least in part on the hexagonal structure of the starting carbon fiber (e.g., PAN carbon). The hexagonal graphene of the PAN may serve as a template, encouraging formation of substantially only the hexagonal crystalline phase of the metal carbide as the exterior portion of the carbon fiber is converted to the metal carbide.

In addition, the hexagonal form provides a unique substrate surface for the formation of the hexagonal form of boron nitride or other hexagonal nitride interface coating. Of the two main polytypes of boron nitride (hexagonal and cubic), the hexagonal form has the desired mechanical properties of a low interlaminar shear strength which is necessary to achieve partial debonding of the fiber from the ceramic matrix.

Such a hexagonal debonding layer serves to prevent or minimize oxidation ingress, which could damage the fibers in the composite, to promote fracture toughness and fiber pull-out, to better manage residual stresses within the composite, including differing coefficient of thermal expansion values for the different composite constituents, and to arrest or minimize crack propagation and expansion. Such a hexagonal boron nitride or other hexagonal nitride interface layer may even promote sealing, closing or self-repair of micro-cracks that may form during use. In other words, the debonding layer ensures that if cracks do form, the debonding occurs between the matrix and the interphase layer. As a result, the cracks do not penetrate the interphase layer, and the fiber is not attacked by oxygen or other ingress agent.

Existing debond interface layers are typically formed on fibers using chemical vapor deposition methods. The present disclosure provides a new mechanism for providing a debonding layer, which includes a hexagonal crystalline structure, matched to the hexagonal crystalline phases of the other composite components.

The metal carbide fiber may be any of those described in the above referenced patents, e.g., prepared through Applicant's Direct Conversion Process™. In an embodiment, the metal carbide fiber comprises alpha silicon carbide, having a hexagonal crystalline structure. In an embodiment, the metal carbide fiber is only partially converted to metal carbide, so that the interior core of the fiber comprises unconverted carbon fiber. The conversion layer may be of any fraction of the total fiber thickness desired, and may typically be 10% or less of the total fiber thickness. For example, a thickness of the silicon carbide or other metal carbide coating on the core of the carbon fiber material may depend on the reaction time and the reaction temperature, and/or draw rate of the fiber through the reaction zone. By way of example, the thickness of the silicon carbide or other metal carbide coating on a 2 μm to 20 μm diameter carbon fiber material may be from approximately 0.001 μm to approximately 1 μm, or all the way up to the full fiber radius or diameter (e.g., up to 10 μm or 20 μm, or whatever the size fiber). Of course, the fibers may be even thinner than 2 μm (e.g., 0.01 μm to 20 μm).

Typically only 10% or less of the fiber radius may be converted, preserving the remainder of the underlying graphene carbon core for increased strength. For example, such a partially converted fiber may retain approximately 80% of the strength of the starting carbon fiber, before partial conversion to metal carbide fiber.

Figure 1:
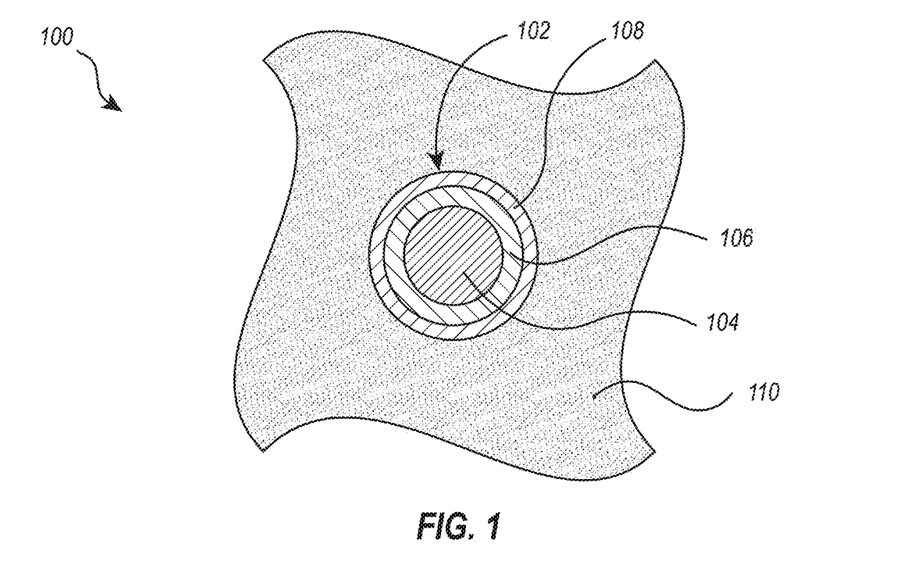
FIG. 1 is a schematic illustration of an exemplary fiber-reinforced ceramic composite including all hexagonal phase components.

FIG. 1 schematically illustrates such fibers 102 disposed within an exemplary composite 100. Fiber 102 is shown as including an unconverted carbon core 104, a converted layer 106 (in which the starting carbon fiber material has been converted to hexagonal a metal carbide, such as alpha silicon carbide). FIG. 1 also shows the hexagonal nitride interface layer 108. The interface coated fiber 102 is shown surrounded by hexagonal ceramic matrix material 110 (e.g., alpha silicon carbide and/or silicon nitride).

However the interface layer 108 is formed, a substantially pure interface layer 108 of hexagonal nitride may be formed (e.g., at least 90%, at least 95%, at least 97%, at least 98%, or at least 99% pure) over the fiber (the combination of 104, 106). The hexagonal boron nitride or other hexagonal interphase layer may typically have a radial thickness of 0.01 μm to 1 μm, from 0.1 μm to 0.8 μm, or from 0.3 μm to 0.5 μm. Such a layer may be provided over each filament of a fibrous material (e.g., tape, braid, weave, felt, or the like), rather than simply coating over the macro-scale fibrous material. The hexagonal crystalline structure of the underlying metal carbide conversion layer (106) may be used to "template" the formation of the hexagonal boron nitride layer.

The hexagonal nitride coating may be substantially uniform in thickness (e.g., variation of less than 50%, less than 25%, less than 10%, less than 5%, or less than 1% in radial thickness around any given fiber).

In addition to disclosure in the provisional filing already incorporated by reference, additional methods for forming a nitride coating over a converted fiber may be adapted from Carbothermal Synthesis of Boron Nitride Coatings on Silicon Carbide, Linlin Chen et al., Journal of the American Ceramic Society (20 Dec. 2004); and from Carbothermal Synthesis of Boron Nitride Coating on PAN Carbon Fiber, M. Das et al., Journal of the European Ceramic Society, Volume 29, Issue 10, July 2009, Pages 2129-2134, each of which is herein incorporated by reference in its entirety.

Formation of a hexagonal nitride interface layer in at least some embodiments may represent a significant improvement over existing methods for providing existing interface layers (which are not necessarily hexagonal). For example, since commercial development by the Société Nationale d'Étude et de Construction de Moteurs d'Aviation (SNECMA) (France) in the mid-1980's, with further development by E.I. du Pont De Nemours & Company, methods of forming a debond layer employed a complex and expensive gaseous vapor process called Chemical Vapor Infiltration (CVI) followed by a vapor formed reactant gas coating deposition into fiber preforms. These methods relied on additional processes such as vacuum deposition which used pulsed gas flow, interrupted flow, and forced gas flow to achieve "passable" engineering uniformity for the debond coating layer throughout the component. This complexity made interface debond coating attributes of large components especially challenging as depletion of reactant gases can lead to non-desired boron nitride polytype formation (i.e., formation of some crystalline phase other than the desired phase), as well as non-uniformity in the thickness of the debond layer throughout fibers in the component.

The CVI process is more art than science and requires extensive operator experience; meaning that controlling the CVI process for fabricating variable part geometries becomes time-consuming, expensive and difficult to scale. For example, the CVI formation of debond layers onto target can result in "brittle" composite behavior if the coating is too thin (<0.1 μm to 0.2 μm). However, if the target crystalline phase of the debond layer was present, and the layer thickness was sufficient, improved fracture toughness of the matrix was possible. If the deposited layer were too thick, the debond layer begins to bridge adjacent fiber filaments and tows causing non-uniform closeout layer(s) to form on the fibrous preform. This bridging will sometimes result in very costly preform rejection.

The polymorph form for boron nitride is very critical to achieving a toughened composite, and not all crystalline structures are suitable. Cubic boron nitride leads to a brittle composite, while hexagonal boron nitride is very robust and is a more desired boron nitride phase for composite construction given the presence of weakly bonded layered planes of hexagonal boron nitride. For turbostratic (layered, out of alignment planes) boron nitride, the onset of composite toughening can be readily apparent yet difficult to replicate both locally and uniformly with a composite structure. The hexagonal form of boron nitride in this composite on the hexagonal alpha silicon carbide represents a very stable solution, where the hexagonal boron nitride is the softest (weakest) among all the boron nitride polymorphs.

In this all hexagonal crystalline phase composite, the boron nitride or other hexagonal nitride interface coating is directly "templated" as hexagonal boron nitride onto the hexagonal alpha silicon carbide or other hexagonal metal carbide layer. This templating process works for any of the hexagonal metal carbide fibers. The hexagonal polymorph boron nitride phase is driven by favorable "free energy of formation" in a similar manner to the formation of hexagonal alpha silicon carbide (or other metal carbide) onto the internal hexagonal structure of the PAN carbon fiber. To form this boron nitride coating, the present process requires a hexagonal metal carbide conversion layer, which may be present over a carbon fiber. The thickness of such a hexagonal nitride layer may be, e.g., up to 1 μm.

While described principally in the context of a boron nitride hexagonal interface coating, it will be appreciated that other hexagonal nitride interface layers may also be suitable for use, including hexagonal aluminum nitride, and/or hexagonal molybdenum nitride. Such nitride layers may be formed by any suitable process. Aluminum nitride has a wurtizite crystalline structure (similar to hexagonal, and within the scope of the presently claimed "hexagonal"). Molybdenum nitride has a hexagonal crystalline structure.

Once the metal carbide fibers have been coated with the hexagonal nitride interface debonding layer, the fibers may be incorporated into a FRCMC. The ceramic matrix is advantageously also one in which the crystalline phase of the matrix material is hexagonal, so as to be matched with the hexagonal phase of the interface layer 108 and the hexagonal phase of the metal carbide conversion layer 106, and the hexagonal graphene carbon core 104.

The fabrication of a hexagonal silicon carbide or other hexagonal ceramic matrix (e.g., hexagonal silicon nitride) may involve infusion with a pre-ceramic polymer. This pre-ceramic polymer typically has a carbon-silicon backbone, such as polycarbosilane. According to the present process, this pre-ceramic polymer is "seeded" with the hexagonal ceramic (e.g., hexagonal silicon carbide and/or hexagonal silicon nitride) in the form of powders, platelets, single crystals, whiskers or chopped or other fibers. These hexagonal "seed" constituents add structure, volume and strength to the matrix, but more importantly, they become a conversion "template" from which the desired hexagonal form of silicon carbide or silicon nitride is formed throughout the matrix.

In addition to providing a hexagonal "template", the "seed" constituents may provide additional beneficial properties to the matrix and the overall composite, such as increased compressive or tensile strength, increased thermal conductivity or increased volume to reduce process steps for matrix densification, etc. For example, ceramic hexagonal phase "seed" particles could have diameters or other particle size characteristics ranging from 0.001 μm to 0.1 μm, lengths from 0.01 μm to 10 μm, and/or aspect ratios (length to diameter) from 0.1 to 100. Hexagonal alpha SiC "seed" platelets could have diameters ranging from 0.01 μm to 100 μm, lengths from 0.1 μm to 10,000 μm and/or aspect ratios from 10 to 1,000. Likewise, hexagonal alpha SiC/C chopped fibers could have diameters from 1 μm to 100 μm, lengths from 0.01 μm to 100,000 μm (or more), and/or aspect ratios of 0.01 to 1,000. Inclusion of such "seed" constituents may range from 5%-60% of the composite, (e.g., as finished, or in its "green" state), by volume. Such characteristics may apply to hexagonal silicon carbide seed constituents (e.g., alpha SiC), to hexagonal silicon nitride, or other hexagonal seed constituents. Such characteristics are summarized in Table 2.

TABLE 2

| Type | Description | Examples of hexagonal phase seed materials | Dimensions (micron) | | | Aspect ratio (length to diameter) |
|---|---|---|---|---|---|---|
| | | | Length range (um) | Diameter range (um) | Thickness range (um) | |
| Particles | ceramic - hexagonal phase | Alpha SiC and other hexagonal metal carbides | 0.01 to 10 | 0.001 to 0.1 | na | 0.1 to 100 |
| Platelets | ceramic - hexagonal phase | Alpha SiC | 0.1 to 10000 | 0.01 to 100 | 0.01 to 100 | 10 to 1000 |
| Chopped Fiber | SiC/C fiber | Alpha SiC/C fiber | 0.01 to 100000 | 1 to 100 | na | 0.01 to 1000 |

The infused preform may be cured at relatively low temperature (e.g., as low as 100° C. with catalysis, or up to 200° C. (no catalyst required), at atmospheric pressure, in air or other atmosphere. Following low temperature curing, the preform may be heated in an inert atmosphere (e.g., argon) to higher temperatures, causing the polymer to decompose, leaving behind atomic silicon and carbon, which normally grow to nano-crystals of beta silicon carbide, but if seeded with hexagonal silicon carbide, as described herein, can be made to template from the seeds to form hexagonal silicon carbide. The temperature at which the high temperature conversion occurs may also be important, to ensure formation of substantially only the hexagonal alpha silicon carbide polymorph. For example, at least 90%, at least 95%, at least 97%, at least 98%, at least 99%, or at least 99.5% of converted matrix may be hexagonal in polymorph form.

For example, the temperature may be greater than 1000° C. (e.g., 1000° C. to 1800° C.). Pressure of the argon atmosphere may be at atmospheric pressure, or at a slightly positive pressure (e.g., up to 10 psig). Formation of silicon nitride is possible by heating the pre-ceramic polymer in a controlled nitrogen atmosphere to temperatures of greater than 500° C., causing the polymer to decompose, leaving behind atomic silicon and nitrogen, which grow to nanocrystals of silicon nitride. Pressure of the nitrogen atmosphere may be at atmospheric pressure, or at a slightly positive pressure (e.g., up to 10 psig). When seeded with hexagonal silicon nitride platelets, the hexagonal silicon nitride polymorph results (rather than the beta silicon nitride polymorph typically used in silicon nitride ceramics). Those of skill in the art will appreciate that economical processes for the formation of a ceramic matrix from conversion of a pre-ceramic polymer are available from Starfire Systems, Inc. or Extreme Environment Materials Solutions, LLC.

The process for forming the ceramic matrix may employ liquid polymer infiltration and pyrolysis (PIP) of a pre-ceramic polymer. During PIP, the fiber preform coated with the hexagonal interface layer with the hexagonal silicon carbide or hexagonal silicon nitride seed particles may be immersed in the polymer under vacuum causing the polymer to infiltrate the porosity in the preform structure being immersed. The preform structure may then be initially pyrolyzed in an inert environment (e.g., of argon gas, or nitrogen gas) at elevated temperature of 500° C. or more and the polymer decomposes into the silicon carbide matrix ceramic, or silicon nitride matrix ceramic. An environment of nitrogen gas will cause the polymer to decompose into silicon nitride, while an inert gas such as argon, or other noble gases will result in silicon carbide. Because of the presence of the hexagonal seed particles, the formed ceramic includes (generally exclusively) the desired hexagonal crystalline form. Owing to shrinkage of the polymer during decomposition to a ceramic, at least two or more PIP cycles may be required to produce parts of adequate density.

Within any given composite structure, the fibers 102 may be homogenously dispersed within the matrix 110. Orientation of the fibers may be random, or oriented in a particular direction, as desired. In an embodiment, some fibers may be oriented in a first direction, while others are in another direction (e.g., some parallel to a longitudinal axis of a tube, vane surface, or other structure, others may be oriented perpendicular to such any such reference axis or surface). Braids, weaves, tapes, fabrics (e.g., felts), or other fibrous forms may be used in such placement of the fibers.

IV. Experimental Data

Actual FRCMCs were formed including all hexagonal phases, as well as hexagonal boron nitride interface coated hexagonal alpha silicon fibers, where the fibers were partially converted (e.g., to include an unreacted carbon core).

Figure 2:
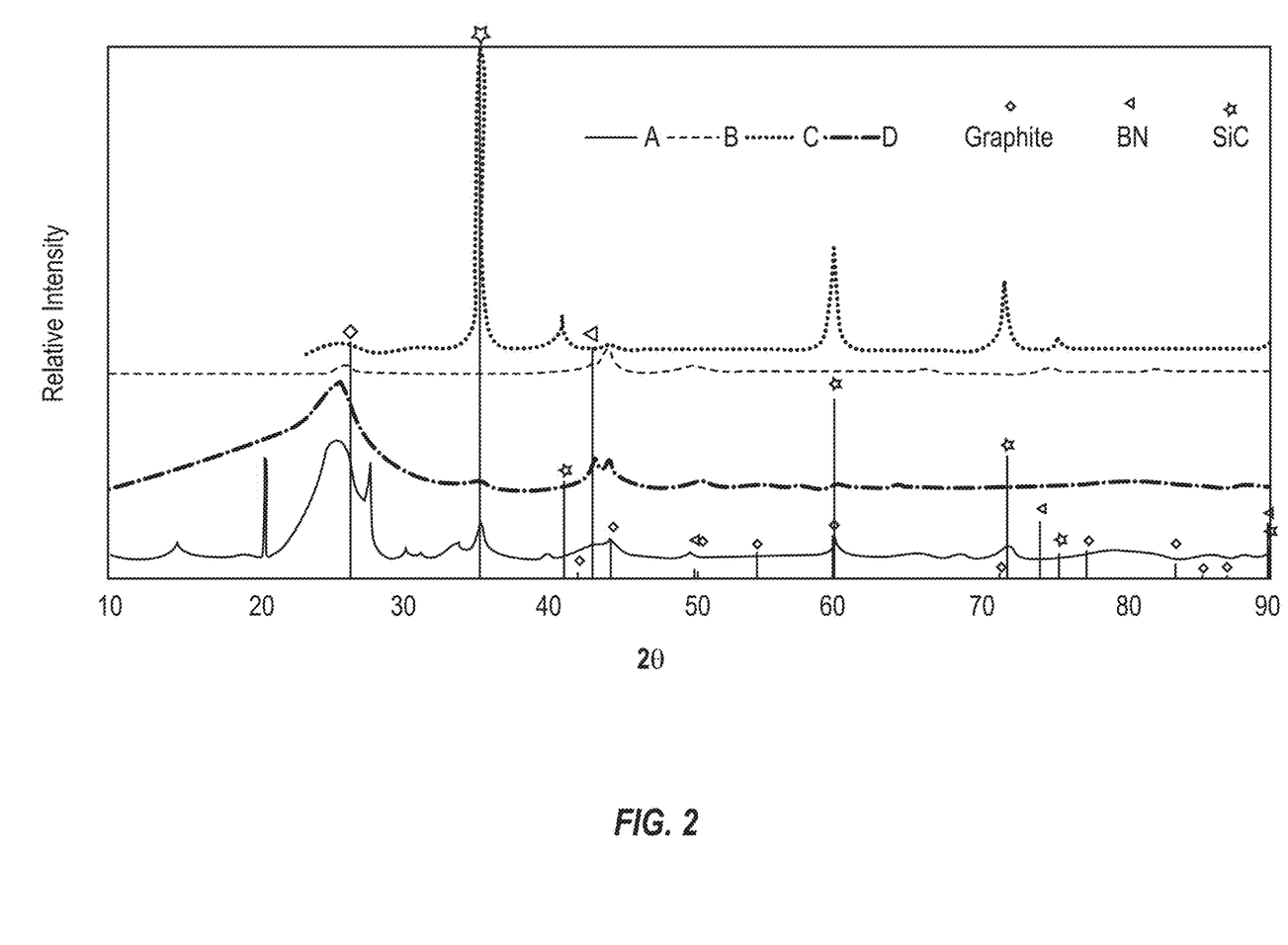
FIG. 2 shows EDAX analysis of the reinforcing fiber material during various stages of the process.
Figure 3A:
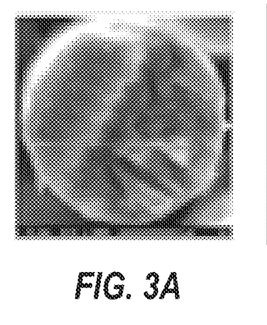
FIGS. 3A-3C show images of fibers during various stages of the process.
Figure 3B:
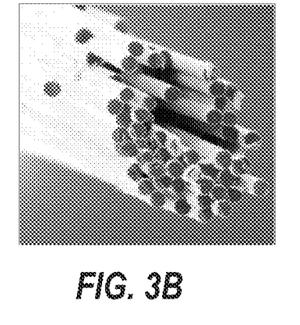
Figure 3C:
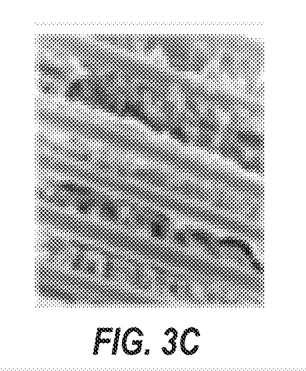
Figure 3D:
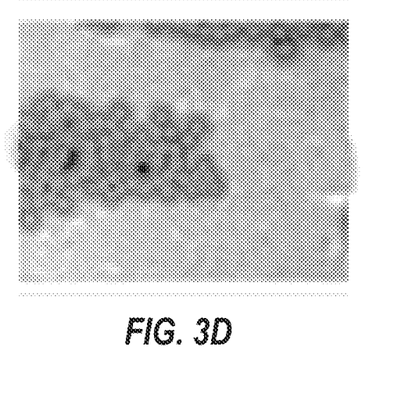
FIG. 3D shows a cross-section through a composite, showing the reinforcing fibers and hexagonal alpha silicon carbide seed particles.

During the described processing steps, the resulting structures were evaluated by various techniques (e.g., x-ray, SEM, and EDS analysis). FIG. 2 shows EDAX spectra analysis results for the samples during various stages of processing. Sample A (step 1) in FIG. 2 shows peaks for graphite carbon, boron nitride, silicon carbide, and boric acid. Sample B (step 2) shows combined graphite carbon and boron nitride phases. Sample C (step 3) shows primarily silicon carbide phases with a very small fraction of boron oxide. Sample D (step 4) shows combined graphite carbon and boron nitride phases and a very small fraction of silicon carbide. Reference XRD spectra were consulted, confirming the presence of a hexagonal boron nitride interphase over the hexagonal alpha silicon carbide. FIG. 3A shows an SEM image of an exemplary hexagonal silicon carbide conversion layer over a carbon fiber core. FIG. 3B shows an SEM image of an exemplary tow or bundle of such fibers. FIG. 3C shows an SEM image of hexagonal silicon carbide fibers (partially converted, as in FIG. 3A), with a hexagonal boron nitride interphase debonding layer formed thereover. FIG. 3D is an SEM image showing the tow such as that of FIG. 3C with hexagonal alpha silicon carbide matrix with hexagonal alpha silicon carbide seed particles dispersed in the matrix.

Figure 4:
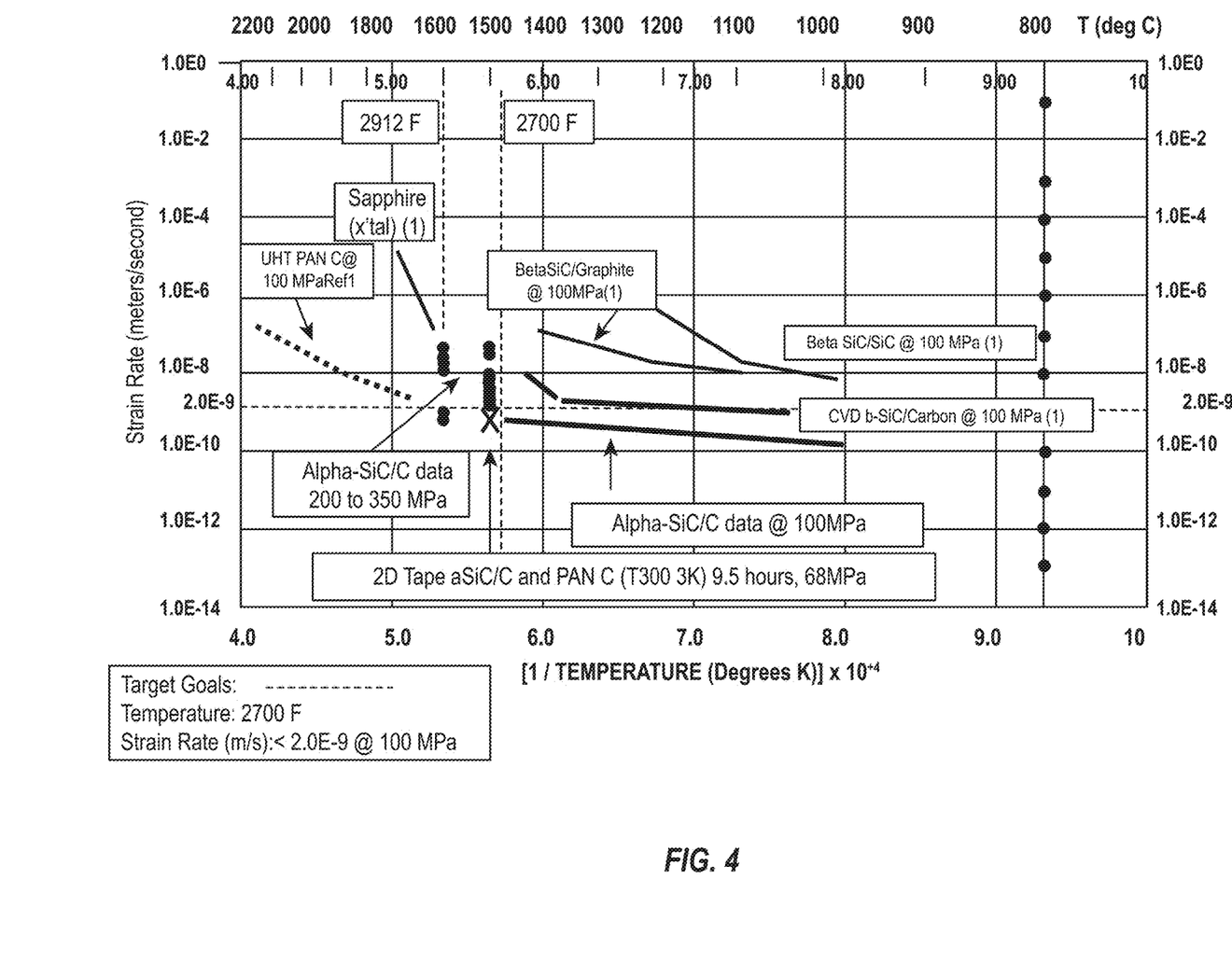
FIG. 4 shows high temperature creep characteristics plotted as strain rate versus the inverse value of temperature $(1/T) \times 10^4$ for an exemplary reinforcing hexagonal carbide fiber, as compared to various other materials, normalized to a strain load of 100 MPa.

Creep plotted as strain rate is often plotted versus the inverse value of temperature (1/T), as the slope of the data line represents the activation energy (Q) of the process in which $F=A*exp(Q/kT)$ where F equals free energy, A is the appropriate constant, Q is activation energy, k is Botzmann's constant, and T is temperature (in Kelvin). FIG. 4 shows high temperature creep strain rate data for hexagonal alpha silicon carbide fibers (partially converted) as compared to various other fibers. As seen, the creep rate is significantly improved at all tested temperatures as compared to the various beta silicon carbide and sapphire fiber materials known in the art. For example, at temperatures of up to 2700° F., the strain rate (creep) is below $2\times10^{-9}$ m/s under a load of 100 MPa. Partial pressure oxygen concentrations for the data in FIG. 4 range from $PO_2$ of 0.001 for carbon, up to $PO_2$ of 0.02 (i.e., air) for the full FRCMCs. All carbon-based fibers and CMCs exhibit lower creep than any of the polycrystalline fiber based-CMCs. Creep above $10^{-8}$ m/s (at 100 MPa) renders the material non-usable in a turbine engine. Applied load is of course important. All reference data has been normalized to a value of 100 MPa. The alpha silicon carbide over carbon fiber core has been tested from 35 MPa to 350 MPa. Such fibers and composites may exhibit such results under such conditions for more than just a moment. For example, such desirable characteristics may be maintained under such conditions for at least 1 hour.

Maintaining a crack-free composite microstructure is key to the ultimate lifetime performance of the composite. For example, the high mechanical strength of the reinforcing fibers maintain the ceramic matrix in a crack-free state which prevents ingress of environmental gas species such as oxygen, salts, and water. Such species will react with the matrix, interface, and/or fiber, limiting the strength and therefore the performance lifetime of the composite.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A composite comprising matched crystalline phases within the constituents of the composite, the composite comprising:
reinforcing hexagonal carbide fibers within a matrix of a hexagonal material, wherein the reinforcing hexagonal carbide fibers include a hexagonal interface coating disposed over the reinforcing hexagonal carbide fibers, such that the hexagonal interface coating, the hexagonal carbide fibers, and the hexagonal material of the matrix all include hexagonal phase structures;
wherein the reinforcing hexagonal carbide fibers are chopped, milled, or otherwise discontinuous.

2. The composite of claim 1, wherein the reinforcing hexagonal carbide fibers comprise alpha silicon carbide fibers, the alpha silicon carbide having a hexagonal phase structure.

3. The composite of claim 1, wherein the hexagonal interface coating comprises hexagonal boron nitride.

4. The composite of claim 1, wherein the hexagonal interface coating comprises at least one of hexagonal boron nitride, hexagonal aluminum nitride, or hexagonal molybdenum nitride.

5. The composite of claim 1, wherein the hexagonal material of the matrix comprises a hexagonal carbide material and/or a hexagonal nitride material.

6. The composite of claim 1, wherein the hexagonal material of the matrix comprises alpha silicon carbide having a hexagonal phase structure.

7. The composite of claim 1, wherein the hexagonal material of the matrix comprises silicon nitride having a hexagonal phase structure.

8. The composite of claim 1, wherein the reinforcing hexagonal carbide fibers comprise 1% to 60% by weight of the composite.

9. The composite of claim 1, wherein the reinforcing hexagonal carbide fibers comprise at least one of fibers, filaments, strands, bundles, tape, whiskers, cloth, or felt.

10. The composite of claim 1, wherein the reinforcing hexagonal carbide fibers comprise at least one of silicon carbide (SiC), erbium carbide (ErC), ytterbium carbide (YbC), molybdenum carbide (MoC), tungsten carbide (WC), tantalum carbide ($Ta_2C$ and/or $TaC_{0.5}$), niobium carbide ($Nb_2C$), vanadium carbide ($V_2C$), praseodymium carbide ($PrC_2$), neodymium carbide ($NdC_2$) and samarium carbide ($SmC_2$), scandium carbide ($ScC_2$), gadolinium carbide ($Gd_2C_2$), magnesium carbide ($Mg_2C_3$), chromium carbide ($Cr_7C_3$) or calcium carbide ($CaC_2$).

11. The composite of claim 1, wherein the composite has a porosity of less than 25% by volume, wherein the pores are non-interconnected, the matrix having a porosity greater than 2% by volume.

12. The composite of claim 1, wherein the reinforcing hexagonal fibers of the composite exhibit creep characteristics of at least one of (a), (b), or (c):
(a) no more than $10^{-8}$ m/s at a static load of 190 MPa at a temperature of up to 1600° C. for at least 1 hour;
(b) no more than $10^{-11}$ m/s at a static load of 30 MPa at a temperature of up to 1600° C. for at least 1 hour;
(c) no more than $10^{-7}$ m/s at a static load of 350 MPa at a temperature of up to 1600° C. for at least 1 hour.

13. An article comprising the composite of claim 1.

14. The article of claim 13, wherein the article is configured as at least a portion of a heat exchanger, gas separation membrane, catalyst support, filter, nuclear fuel containment, fusion reactor component, hot gas engine, turbine engine, heat shield, jet vane, space structure stabilization, chemical liner, body frame, brake pad, body armor, vehicle armor, engine, engine component, structural member, sporting good, drill bit, wear bit, hypersonic missile, or rocket component.

15. The article of claim 13, wherein the article is configured as at least a portion of a heat exchanger or an engine component.

16. The article of claim 13, wherein the composite envelopes a core or is formed on a substrate, or where the composite is a core or a substrate of the article.

17. A method for forming a composite that comprises matched phases within the constituents of the composite, the method comprising:
providing reinforcing hexagonal carbide fibers;
forming a hexagonal interface coating over the reinforcing hexagonal carbide fibers;
positioning the reinforcing hexagonal fibers within a matrix of a hexagonal material, such that the hexagonal interface coating, the hexagonal carbide fibers, and the hexagonal material of the matrix all include hexagonal phase structures;
wherein the matrix comprises at least one of hexagonal silicon carbide or hexagonal silicon nitride;
wherein the matrix is formed by a transformation reaction in the presence of the hexagonal interface coating, the hexagonal interface coating comprising at least one of hexagonal boron nitride, hexagonal aluminum nitride or hexagonal molybdenum nitride; and
wherein the matrix is formed by templating onto hexagonal seed particles of at least one of hexagonal silicon carbide or hexagonal silicon nitride within a preform structure of the composite;
wherein the matrix comprises at least one of hexagonal silicon carbide or hexagonal silicon nitride;

wherein the matrix is formed by a transformation reaction in the presence of the hexagonal interface coating, the hexagonal interface coating comprising at least one of hexagonal boron nitride, hexagonal aluminum nitride or hexagonal molybdenum nitride; and wherein the matrix is formed by templating onto hexagonal seed particles of at least one of hexagonal silicon carbide or hexagonal silicon nitride within a preform structure of the composite.

18. A method for forming a composite that comprises matched phases within the constituents of the composite, the method comprising:

providing reinforcing hexagonal carbide fibers;

forming a hexagonal interface coating over the reinforcing hexagonal carbide fibers;

positioning the reinforcing hexagonal fibers within a matrix of a hexagonal material, such that the hexagonal interface coating, the hexagonal carbide fibers, and the hexagonal material of the matrix all include hexagonal phase structures;

wherein the matrix comprises at least one of hexagonal silicon carbide or hexagonal silicon nitride;

wherein the matrix is formed by a transformation reaction in the presence of the hexagonal interface coating, the hexagonal interface coating comprising at least one of hexagonal boron nitride, hexagonal aluminum nitride or hexagonal molybdenum nitride; and wherein the matrix is formed by templating onto hexagonal seed particles of at least one of hexagonal silicon carbide or hexagonal silicon nitride within a preform structure of the composite;

wherein the hexagonal interface coating comprises a hexagonal boron nitride interface coating formed by templating onto a hexagonal structure provided by the reinforcing hexagonal carbide fibers.

19. A composite comprising matched crystalline phases within the constituents of the composite, the composite comprising:

reinforcing hexagonal carbide fibers within a matrix of a hexagonal material, wherein the reinforcing hexagonal carbide fibers include a hexagonal interface coating disposed over the reinforcing hexagonal carbide fibers, such that the hexagonal interface coating, the hexagonal carbide fibers, and the hexagonal material of the matrix all include hexagonal phase structures;

wherein the hexagonal material of the matrix comprises silicon nitride having a hexagonal phase structure.

20. The composite of claim 19, wherein the reinforcing hexagonal carbide fibers comprise alpha silicon carbide fibers, the alpha silicon carbide having a hexagonal phase structure.

21. The composite of claim 19, wherein the hexagonal interface coating comprises at least one of hexagonal boron nitride, hexagonal aluminum nitride, or hexagonal molybdenum nitride.

22. The composite of claim 19, wherein the reinforcing hexagonal carbide fibers comprise 1% to 60% by weight of the composite.

23. The composite of claim 19, wherein the reinforcing hexagonal carbide fibers comprise at least one of fibers, filaments, strands, bundles, tape, whiskers, cloth, or felt.

24. The composite of claim 19, wherein the reinforcing hexagonal carbide fibers comprise at least one of silicon carbide (SiC), erbium carbide (ErC), ytterbium carbide (YbC), molybdenum carbide (MoC), tungsten carbide (WC), tantalum carbide ($Ta_2C$ and/or $TaC_{0.5}$), niobium carbide ($Nb_2C$), vanadium carbide ($V_2C$), praseodymium carbide ($PrC_2$), neodymium carbide ($NdC_2$) and samarium carbide ($SmC_2$), scandium carbide ($ScC_2$), gadolinium carbide ($Gd_2C_2$), magnesium carbide ($Mg_2C_3$), chromium carbide ($Cr_7C_3$) or calcium carbide ($CaC_2$).

25. The composite of claim 19, wherein the composite has a porosity of less than 25% by volume, wherein the pores are non-interconnected, the matrix having a porosity greater than 2% by volume.

26. The composite of claim 19, wherein the reinforcing hexagonal fibers of the composite exhibit creep characteristics of at least one of (a), (b), or (c):

(a) no more than $10^{-8}$ m/s at a static load of 190 MPa at a temperature of up to 1600° C. for at least 1 hour;

(b) no more than $10^{-11}$ m/s at a static load of 30 MPa at a temperature of up to 1600° C. for at least 1 hour;

(c) no more than $10^{-7}$ m/s at a static load of 350 MPa at a temperature of up to 1600° C. for at least 1 hour.

27. An article comprising the composite of claim 19.

28. The article of claim 27, wherein the article is configured as at least a portion of a heat exchanger, gas separation membrane, catalyst support, filter, nuclear fuel containment, fusion reactor component, hot gas engine, turbine engine, heat shield, jet vane, space structure stabilization, chemical liner, body frame, brake pad, body armor, vehicle armor, engine, engine component, structural member, sporting good, drill bit, wear bit, hypersonic missile, or rocket component.

29. The article of claim 27, wherein the article is configured as at least a portion of a heat exchanger or an engine component.

30. The article of claim 27, wherein the composite envelopes a core or is formed on a substrate, or where the composite is a core or a substrate of the article.

31. A composite comprising matched crystalline phases within the constituents of the composite, the composite comprising:

reinforcing hexagonal carbide fibers within a matrix of a hexagonal material, wherein the reinforcing hexagonal carbide fibers include a hexagonal interface coating disposed over the reinforcing hexagonal carbide fibers, such that the hexagonal interface coating, the hexagonal carbide fibers, and the hexagonal material of the matrix all include hexagonal phase structures;

wherein the composite has a porosity of less than 25% by volume, wherein the pores are non-interconnected, the matrix having a porosity greater than 2% by volume.

* * * * *